F. A. POLLARD.
AUTOMATIC THERMIC VALVE CONTROLLING APPARATUS.
APPLICATION FILED MAR. 21, 1911.
1,082,212.
Patented Dec. 23, 1913.
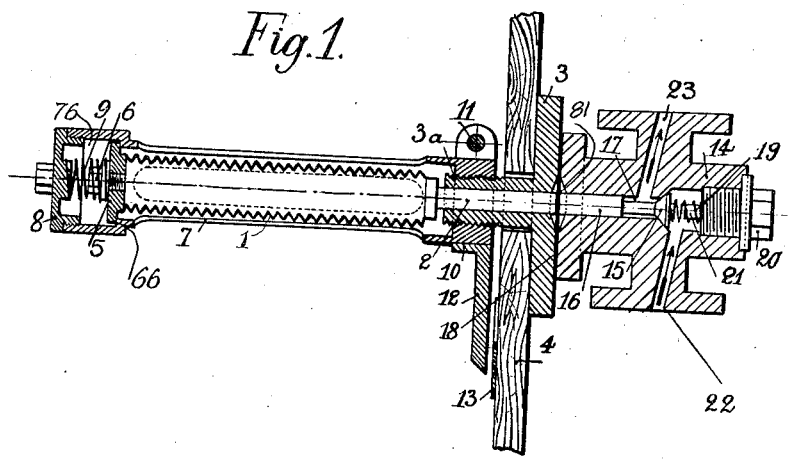
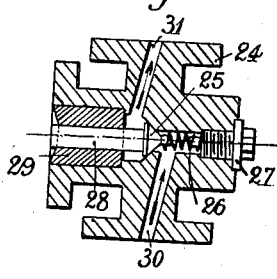

UNITED STATES PATENT OFFICE.

FRÉDÉRIC AUGUSTIN POLLARD, OF PARC ST. MAUR, FRANCE.

AUTOMATIC THERMIC VALVE-CONTROLLING APPARATUS.

1,082,212.

Specification of Letters Patent.  Patented Dec. 23, 1913.

Application filed March 21, 1911. Serial No. 615,882.

*To all whom it may concern:*

Be it known that I, FRÉDÉRIC AUGUSTIN POLLARD, of 24 Rue Lucie, Parc St. Maur, Seine, France, engineer, have invented a new and useful Improvement in Automatic Thermic Valve-Controlling Apparatus, which improvement is fully set forth in the following specification.

This invention has for its object automatic apparatus for a maximum or minimum regulation of the temperature of a space containing a liquid or gaseous medium cooled or heated by means of a fluid.

Apparatus according to this invention consists of an elastic tube filled with an incongealable highly expansible liquid exposed to the action of a cooled or heated medium, and acting when expanded or contracted upon a valve serving to regulate or alter the inlet of the fluid producing the rise or fall of the temperature of the medium surrounding the elastic tube.

The apparatus is further provided with means for regulating the maximum or minimum degree of temperature which should not be passed.

The accompanying illustrative drawing shows two methods of carrying out this invention.

In the drawing Figure 1 is a longitudinal section of an apparatus for limiting the fall in temperature and Fig. 2 is a transverse section of the apparatus shown in Fig. 1. Fig. 3 is a view partially in section of an apparatus for limiting either the rise or fall in temperature due to a refrigerating apparatus.

The apparatus shown in Figs. 1 and 2 comprises an elastic tube 1 capable of longitudinal expansion and terminating at one end in a rod 2 sliding in the transverse opening in a plate 3 fixed to a partition 4 which separates the medium to be cooled (which surrounds the tube 1) from the outer atmosphere. The other end of the tube 1 is fixed to a disk 5, which is bored with a hole normally closed by a screw plug 6. The tube 1 is completely filled through the said hole with an incongealable highly expansible liquid such as alcohol or a solution of calcium chlorid. The disk 5 can slide in the end of a tube 7 pierced with holes or slots whose other end is screwed onto a prolongation 3ª of the plate 3. The tube 7 is provided with a screw plug 8 serving to tighten the helical spring 9 interposed between the disk 5 and the said plug. At the end of the tube 7 near to the partition 4 is mounted a collar 10 provided with a tightening nut 11 and a pointer 12 adapted to move in front of a fixed scale 13 mounted on the partition 4.

14 is a valve box containing a valve 15 fixed to a rod 16 situated opposite the rod 2 and capable of sliding in a bore 17 formed in the valve box 14. The rod 16 is separated from the rod 2 by an elastic membrane 18 secured between the plate 3 and the valve box 14. The valve 15 is kept on its seating by a spring 19 which bears against a screw plug 20; a stop 21 with which the screw plug is provided serves to limit the movement of the valve 15. When the valve 15 is on its seating, the rod 16 is in contact with the membrane or elastic diaphragm 18 without however exerting any action upon it. The passage 17 communicates through the passage 22 with the pipe conveying the refrigerating fluid and through the passage 23 with the pipe conveying this fluid into the medium to be cooled which surrounds the elastic tube 1. The said elastic tube, it will be noted, is expansible only in the direction of its length, being preferably constructed for this purpose of transversely corrugated material or, in other words, bellows-shaped, whereby the entire effect of the expansion of the tube which is directly connected to the rod 2 is transmitted to the valve 15. It will be noted, also, that the disk 5 constituting the left-hand end of the tube 1 fits into the enlargement or chamber 76 of the tube 7, within which it is permitted to move against the stress of the spring 9 being therein limited in its longitudinal movements by the inner edge of the screw-plug 8 and the shoulder 66 on the said enlargement 76.

The apparatus works as follows:—The elastic tube 1 being filled with incongealable and highly expansible fluid is mounted with its outer tube 7 upon the prolongation 3ª of the plate 3. The tube 7 is screwed in until the end of the rod 2 coincides with the outer face (right hand in the drawing) of the plate 3. The diaphragm 18 is then placed in position and fixed by the valve box 14 to be secured to the plate 3 by suitable means. In this position of the parts which is that shown in the drawings the valve 15 is held on to its seating by the spring 19 and the membrane 18 is in midposition. In order to set the apparatus in action, the temperature of the fluid in the tube 1 is measured; the nut 11 of the collar 10 is unscrewed and the pointer 12 is brought (without altering the angle of the tube 7) opposite the figure on the scale 13 corresponding to the temperature measured. The nut 11 is then screwed up, so as to render the collar 10 fast with the tube 7 and the pointer 12 is brought opposite the figure on the scale 13 corresponding to the temperature to which the medium which surrounds the tube 1 is to be brought, thereby correspondingly turning the tube 7. The apparatus is mounted on the pipe conveying the refrigerating fluid in such a manner as to be traversed in the direction indicated by the arrows in Fig. 1. As the temperature to which the medium to be refrigerated should be brought is necessarily lower than that of the tube 1 before the starting of the apparatus the screw thread in the plate 3 should be so arranged that the angular displacement of the tube 7, as has been described, has for effect to rotate the tube 1 (which is not compressible at constant temperatures) so as to move the rod 2 in the direction of the membrane 18. This membrane which is allowed sufficient play by the parts 3 and 14 by virtue of the lenticular recess 81 formed between the said parts is then deformed by the rod 2 and lifts the valve 15 from its seating against the action of a spring 19 through the intermediary of the rod 16. When the valve comes into contact with the stop 21 it remains stationary. The tube 7 continues to move to the right (Fig. 1) until the new position of the pointer 12 is reached and the disk 5 is pushed toward the plug 8 compressing the spring 9. When the valve 15 is open the refrigerant passes into the space or chamber containing the tube 1 which causes a gradual lowering of the temperature in this space, and consequently a contraction of the tube 1. As the spring 9 is much more powerful than the spring 19, the valve 15 is not applied to its seating, but it moves the disk 5 away from the plug 8 a distance proportional to the contraction of the tube 1. When the disk 5 after the setting of the tube 7 which serves as an abutment to it, is in the position shown in the drawing, that is to say with the disk 5 resting against the shoulder 66 of the enlargement 76 of the tube 7, the contraction of the tube 1 has for effect to bring the valve 15 nearer to its seat and thus practically to stop the passage of the refrigerator-fluid. The apparatus is arranged in such a manner as regards the screw thread of the prolongation 3ª of the plate 3 and the power of the springs that this working phase commences when the medium surrounding the tube 1 is nearly at the degree of temperature set by the pointer 12 on the scale 13. As the quantity of refrigerating fluid introduced into the space becomes smaller the contraction of the tube 1 is less rapid and then quite ceases when equilibrium has been established in which the quantity of refrigerating fluid passing the valve 15 is sufficient to maintain the temperature in the space. When the temperature rises the tube 1 expands and raises the valve 15 thus allowing a larger quantity of the refrigerating fluid to pass the valve. If on the contrary the temperature falls the tube 1 contracts and closes the valve thus diminishing the quantity of fluid introduced into the space. The spring 9 will allow the tube 1 to be accidentally subjected to abnormal expansion without injury to the apparatus, as this spring allows the tube 1 the play practically necessary for all degrees of expansion.

In the modified form shown in part in Fig. 3 the portion of the apparatus contained within the space (that is to say to the left of the elastic membrane in the drawing) remains the same as in the apparatus above described and has consequently not been illustrated. The valve box 24 contains a valve 25 acted upon by a spring 26 which has for abutment a screw plug 27. The valve 25 is provided with a stem 28 guided in a bush 29 mounted in the valve box 24; the stem 28 whose free end rests upon the elastic membrane owing to the spring 26 is of a length such that the valve 25 is applied to its seating when the diaphragm is in mid position. The valve then stops communication between the passages 30 and 31.

When using this apparatus to regulate heating the valve box 24 is placed within the pipe conveying heating fluid in such a manner as to be traversed as indicated by the arrows in the drawing. The apparatus then works as follows: So long as the temperature desired is not attained the valve 25 remains open and allows fluid to pass; when the desired temperature is attained the elastic tube which has expanded acts upon the membrane and consequently upon the valve 25 which it tends to close. A state of equilibrium then sets in, in which the valve allows the passage of exactly the quantity of fluid necessary to maintain the temperature at the required degree. When the temperature falls, the tube contracts and the valve allows a larger quantity of fluid to pass. When on the contrary the temperature rises, the valve is further closed and allows less fluid to pass.

When the arrangement is used for regulation when refrigerating by direct vaporization of the gas liquefied by a refrigerating machine the valve box 24 is not interpolated in the main circuit of the refrigerating fluid but in a shunt starting from a point of the pipe above the cock or of the regulating apparatus serving for the introduction of the fluid into the space for leading into the compressor aspiration pipe below the space. So long as the temperature desired is not attained the valve 25 is forced on to its seating by the expanded elastic tube and the circulation of the fluid takes place in the usual manner. When the desired temperature is attained the elastic tube contracts, the valve 25 can be lifted from its seat by the spring 26 so that a greater or less portion of the fluid will be shunted and will pass directly to the compressor. This method of working has the following advantage: the compressor works when cold during an interruption of the refrigeration so that its lubrication is assured; if the circulation of the liquefied gas were merely interrupted (in place of being shunted) the compressor aspirating the rarefied vapors and delivering them at the pressure of condensation would soon be excessively heated.

The described apparatus may, as stated, serve for regulation of temperature either in heating or cooling and the temperature regulating fluid passing through 22 and 23 and governed by 1 may be either a refrigerating liquid or gas or vapor or a heating liquid or vapor as the case may be. And where a refrigerating liquid is mentioned it will be understood that a heating medium may be employed where a control of heating instead of a control of refrigeration is intended.

Claims:—

1. In an automatic temperature regulator, an elastic longitudinally expansible and contractile tube filled with a thermostatic liquid and a duct for temperature-changing fluid, in combination with an elastic diaphragm closing off the duct from the space wherein the expansible and contractile tube is arranged, a valve arranged in said duct to open or close the same, said valve having a stem bearing against the diaphragm, yielding means tending to urge the valve-stem against the diaphragm, and a slidable rod arranged between the elastic tube and the diaphragm and bearing against the latter.

2. In an automatic temperature regulator, an elastic longitudinally expansible and contractile tube filled with a thermostatic liquid, a duct for temperature-regulating fluid, and a valve-seat arranged in said duct, in combination with an elastic diaphragm closing off the duct from the space wherein the tube is arranged, a rod connected to the tube and bearing against the diaphragm at one side, a valve to control the flow of temperature-changing fluid and having a stem arranged to bear against the diaphragm and opposed to the rod connected to the tube and a spring yieldingly urging the valve toward the diaphragm.

3. In an automatic temperature regulator, an elastic lengthwise expansible and contractile tube filled with liquid and adapted to be introduced into the space where the temperature is to be regulated, a duct for temperature-changing fluid and a valve arranged in said duct to control the passage of fluid therethrough, in combination with connections between said valve and the elastic tube for actuating said valve according to the expansion or contraction of said tube, a spring for urging the valve toward the tube, a stronger spring for urging the tube toward the valve, a stop for limiting the action of the second spring and means for adjusting said stop.

4. In an automatic temperature regulator, an elastic lengthwise expansible and contractile tube filled with liquid, a duct for temperature-changing fluid, a partition separating the tube from the duct, a valve and a seat for the same arranged in said duct, connecting rods between said valve and tube, a screw-threaded portion arranged on the partition through which one of the rods passes, an open tube engaging said screw-threaded portion, said open tube inclosing the elastic liquid-filled tube and provided with an enlargement at its outer end having an inner shoulder, a disk at the outer end of the elastic tube and arranged within the enlargement, a spring also arranged in the enlargement and tending to urge the elastic tube toward the valve, and a second spring, weaker than the first, tending to force the valve toward the elastic tube.

5. In an automatic temperature regulator, an elastic lengthwise expansible and contractile tube filled with liquid, a duct for temperature-changing fluid, a partition separating the tube from the duct, a valve and a valve-seat for the same, arranged in said duct, connecting rods between said valve and tube, a screw-threaded portion arranged on the partition through which one of the rods passes, an open tube engaging said screw-threaded portion, said open tube inclosing the elastic liquid-filled tube and provided with an enlargement at its outer end having an inner shoulder, a disk at the outer end of the elastic tube and arranged within the enlargement, a spring also arranged in the enlargement and tending to urge the elastic tube toward the valve, and a second spring, weaker than the first, tending to force the valve toward the elastic tube, and a pointer arranged on the open tube.

6. In an automatic temperature regulator, an elastic lengthwise expansible and contractile tube filled with liquid, a duct for temperature-changing fluid, a partition separating the tube from the duct, a valve and a valve-seat for the same, arranged in said duct, connecting rods between said valve and tube, a screw-threaded portion arranged on the partition through which one of the rods passes, an open tube engaging said screw-threaded portion, said open tube inclosing the elastic liquid-filled tube and provided with an enlargement at its outer end having an inner shoulder, a disk at the outer end of the elastic tube and arranged within the enlargement, a spring also arranged in the enlargement and tending to urge the elastic tube toward the valve, and a second spring, weaker than the first, tending to force the valve toward the elastic tube, and an adjustable pointer arranged on the open tube.

In testimony whereof I have signed this specification in the presence of two subscribing witnesses.

FRÉDÉRIC AUGUSTIN POLLARD.

Witnesses:
 DEAN B. MASON,
 J. COMB.